US012660745B1

(12) United States Patent　　　(10) Patent No.:　US 12,660,745 B1

Wachholz　　　(45) Date of Patent:　Jun. 23, 2026

(54) Y-DROP ATTACHMENT FOR AN AGRICULTURAL APPLICATOR

(71) Applicant: Joshua Carl Wachholz, Oshkosh, WI (US)

(72) Inventor: Joshua Carl Wachholz, Oshkosh, WI (US)

( * ) Notice: Subject to any disclaimer, the term of this patent is extended or adjusted under 35 U.S.C. 154(b) by 649 days.

(21) Appl. No.: 17/973,447

(22) Filed: Oct. 25, 2022

Related U.S. Application Data

(60) Provisional application No. 63/300,242, filed on Jan. 17, 2022, provisional application No. 63/271,921, filed on Oct. 26, 2021.

(51) Int. Cl.
| | |
|---|---|
| *A01C 23/02* | (2006.01) |
| *A01C 23/04* | (2006.01) |
| *A01M 7/00* | (2006.01) |

(52) U.S. Cl.
CPC .......... *A01C 23/028* (2013.01); *A01C 23/023* (2013.01); *A01C 23/025* (2013.01); *A01C 23/047* (2013.01); *A01M 7/006* (2013.01); *A01M 7/0082* (2013.01)

(58) Field of Classification Search
CPC ..... A01C 23/028; A01C 23/008; A01B 49/06; A01M 7/005; A01M 7/006; A01M 7/0071; A01M 7/0082
See application file for complete search history.

(56) References Cited

U.S. PATENT DOCUMENTS

| | | | |
|---|---|---|---|
| 1,348,038 A | 7/1920 | Neumeyer | |
| 2,301,213 A | 11/1942 | Kang | |
| 2,874,656 A | * 2/1959 | Bennett | ................ A01C 23/025 |
| | | | 172/699 |
| 3,147,568 A | 9/1964 | Inhofer | |
| 3,581,685 A | * 6/1971 | Taylor | .................. A01C 23/025 |
| | | | 172/730 |
| 5,333,559 A | * 8/1994 | Hodapp | ................... A01C 5/06 |
| | | | 111/175 |
| 6,397,767 B1 | * 6/2002 | Dietrich, Sr. | ........ A01C 23/022 |
| | | | 111/119 |
| 9,167,745 B2 | 10/2015 | Muff | |

(Continued)

OTHER PUBLICATIONS

Teejet Technologies, Row Application Kit Part #: 23770-SS, as viewed at https://sprayersupplies.com/23770-ss-teejet-a5222445? gclid=
EAlalQobChMIx9rq15TS8gIVTD6tBh3KpwcWEAQYASABEgJsf_ D_BwE on Aug. 27, 2021. 2 pages.

(Continued)

*Primary Examiner* — Alicia Torres
(74) *Attorney, Agent, or Firm* — Brannen Law Office, LLC

(57)　　ABSTRACT

A Y-drop attachment for an agricultural applicator has a riser, a plate and a fertilizer delivery assembly. The riser can have a top and bottom with a hole and a slot formed therethrough. The plate can be generally triangular shaped. A slot can be formed in the front of the triangle where the two shorter sides meet. The riser can be received within the slot and fixed to the plate at the slot. A hole can be through the plate behind the slot. The fertilizer delivery assembly can have a splitter, two rigid tubes and two flexible tubes. The splitter has an inlet and two outlets, with one rigid tube being connected to each outlet. One downward oriented flexible tube can be connected to the distal end of each rigid tube.

19 Claims, 15 Drawing Sheets

(56)         References Cited

U.S. PATENT DOCUMENTS

2017/0265379  A1      9/2017   Moore et al.
2021/0251133  A1      8/2021   Wagler

OTHER PUBLICATIONS

Unverferth Manufacturing Company, Inc., NutriMax Liquid Fertil-
izer Applicator, as viewed at https://www.umequip.com/fertilizer-
application/nutrimax-liquid-applicator/ on Aug. 20, 2021. 3 pages.
Unverferth Manufacturing Company, Inc., Application Options
Single, Double or Dual Delivery, digital document with copyright
notice of 2017, date saved Aug. 20, 2021. 2 pages.

* cited by examiner

S110     providing a riser

S111     connecting the riser to the applicator

S112     providing a plate with a hole allowing
the existing distribution tube to pass therethrough S113     passing the existing distribution tube through
the hole S114     providing a fertilizer delilvery assembly S120 — providing a riser, said riser having a riser top and a riser bottom, said riser having at least one connection opening therethrough S121 — providing a plate having a plate front and a plate rear, said plate front having a slot formed therein S122 — connecting the riser to said plate in said slot S123 — providing a fertilizer delivery assembly

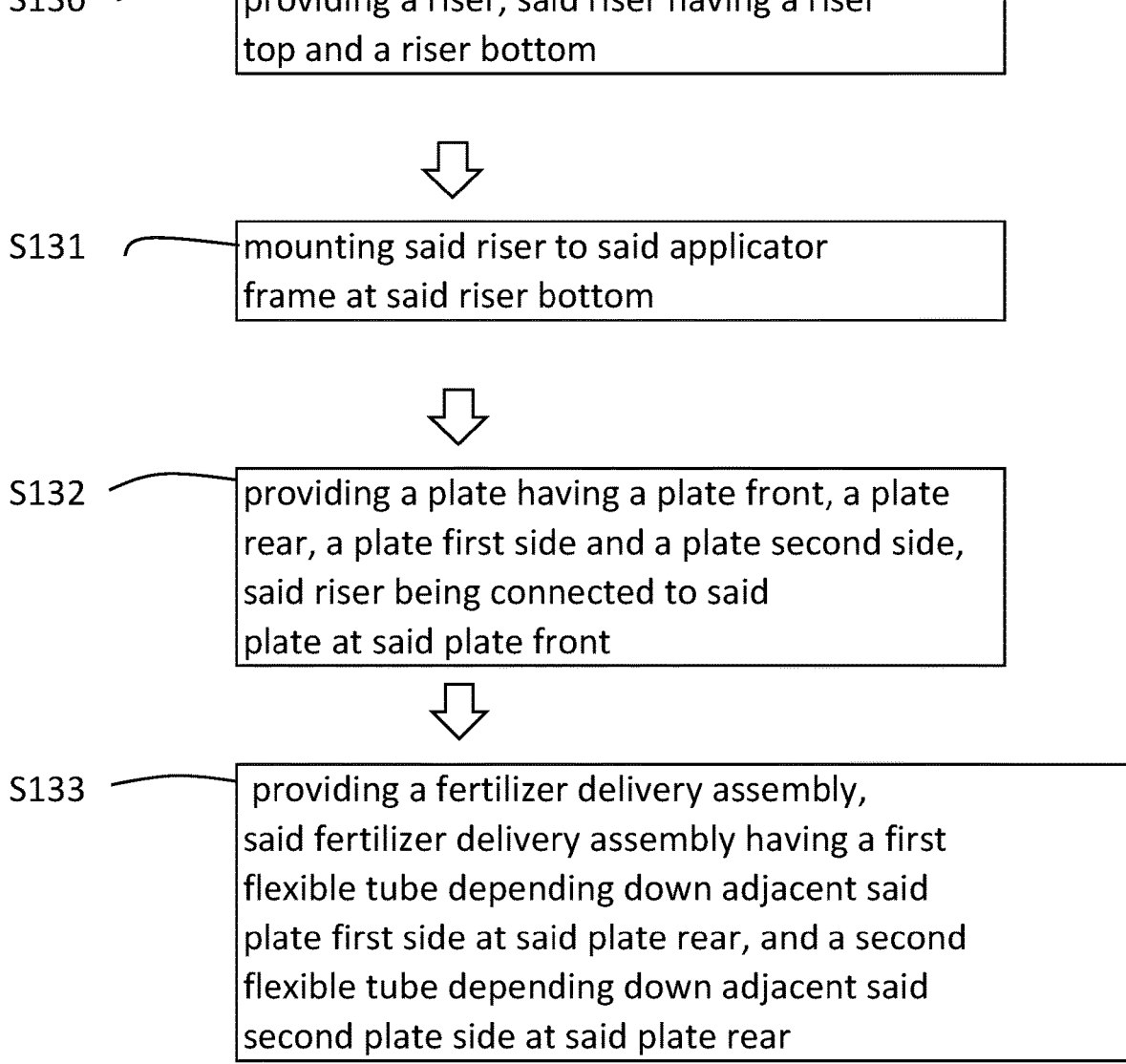

S130 — providing a riser, said riser having a riser top and a riser bottom

S131 — mounting said riser to said applicator frame at said riser bottom

S132 — providing a plate having a plate front, a plate rear, a plate first side and a plate second side, said riser being connected to said plate at said plate front S133 — providing a fertilizer delivery assembly, said fertilizer delivery assembly having a first flexible tube depending down adjacent said plate first side at said plate rear, and a second flexible tube depending down adjacent said second plate side at said plate rear

FIG. 14

S140 — providing a riser

S141 — mounting the riser to the applicator

S142 — providing a plate

S143 — joining the plate and riser together at an angle of between 80 and 85 degrees S144 — providing a fertilizer delivery assembly supported by said plate

Y-DROP ATTACHMENT FOR AN AGRICULTURAL APPLICATOR

This U.S. utility patent application claims priority on and the benefit of pending provisional application 63/271,921 filed Oct. 26, 2021, and also claims priority on and the benefit of pending provisional application 63/300,242 filed Jan. 17, 2022, the entire contents of both being hereby incorporated herein by reference.

BACKGROUND OF THE INVENTION

1. Field of the Invention

The present invention relates to a Y-drop attachment for an agricultural applicator, and in particular to a Y-drop that is used with existing applicator structures, and to the methods of using the same.

2. Description of the Related Art

The benefits of fertilizing agricultural crops are well known. Providing proper nutrients to the plants is an important part of attempting to grow heathy crops with high yields. It is desirable to use only enough fertilizer, placed in the right locations, in order to efficiently fertilize the crops without waste.

Applicator tubes are often attached to knives adjacent coulter discs to distribute fertilizer between crop rows. While this may work well for it intended purposes, such use is not ideal in all situations. For example, when crops are young, their roots may not extend to the middle of the area between the crop rows. Hence, this would result in fertilizer being applied to a less than optimal area.

Y-drops have been developed to address this general problem. In some situations, the Y-drops replace the coulters on the applicator. Doing so allows multiple Y-drops to be used to apply fertilizer to several rows during each pass of the tractor. Yet, removal of the coulters is time consuming, requires storage space and risks damage to the coulters during installation, removal and storge.

Another attempted solution provides an integrated solution wherein a Y-drop was integrated into a coulter and attached to the front (leading side) and the distribution tubes passed rearward on both sides of the disc. The traditional delivery location behind the disc is also provided. Such as system does have the ability to determine where the fertilizer is applied (sides or center). Yet, as an integrated system, it cannot be used with other systems. Further, the relative long tubes can vibrate. Vibration can cause wear on the tubes and also interfere with application precision.

Thus, there exists a need for a Y-drop attachment for an agricultural applicator and methods of use thereof that solves these and other problems.

SUMMARY OF THE INVENTION

The present invention relates to a Y-drop attachment for an agricultural applicator and to the methods of using the same. The Y-drop has a riser, a plate and a fertilizer delivery assembly. The riser can have a top and bottom with a hole and a slot formed therethrough. The plate can be generally triangular shaped. A slot can be formed in the front of the triangle where the two shorter sides meet. The riser can be received within the slot and fixed to the plate at the slot. A hole can be through the plate behind the slot. The fertilizer delivery assembly can have a splitter, two rigid tubes and two flexible tubes. The splitter has an inlet and two outlets, with one rigid tube being connected to each outlet. One downward oriented flexible tube can be connected to the distal end of each rigid tube.

There are many aspects and of the present invention, which each can have unique and independent advantages, as set out in particular in the appended claims.

According to one advantage of the present invention, the Y-drop attached to the same bolts as the knife use to connect to the frame (behind the disc). Attaching there advantageously allows for a compact design to minimize vibration. Limiting vibration reduces risks of breakage and risks of having less than desired fertilizer application precision.

According to another advantage of the present invention, the Y-drop has a riser to elevate the position of the plate relative to the ground (during use). This advantageously allows the plate to be located at a distance above the ground where risks of contacting rocks or other obstructions are reduced as the plate can pass over them.

According to a further advantage yet of the present invention, flexible tubes depend downward from the rigid tubes connected to the plate. This allows the fertilizer to be applied in a downward manner instead of an angled manner, resulting is precise fertilizer application. Also, this allows the tubes move out of the way of obstructions, due to their flexibility, and return to their position once the obstruction is cleared.

According to a still further advantage of the present invention, the plate can have a triangular shape, with the narrow portion being in the front and the wide portion being at the rear. This allows the plate to deflect any obstructions that contact it.

According to a still further advantage yet of the present invention, the plate has a tube hole therethrough. The hole can be near the front of the plate and allows existing tubing to be used to pass through it to connect to a traditional knife-mounted application nozzle, which when used with the present invention, provides for a dual-delivery system wherein a user can route fertilizer either via the knife nozzle or via the Y-drop, both, or neither. The tube hence does not need to be rerouted and is also protected as the plate is apt to deflect potential obstructions.

According to a still further advantage yet of the present invention, there is a slot in the front of the plate for receiving the top of the riser. The riser can be welded or otherwise fixed in the slot. The riser is preferably flat and is oriented along the slot longitudinal axis, resulting in the plate being resistant to twisting relative to the riser, aiding in structural stability. Further, the plate is preferably symmetrical about the slot axis. These features aid in minimizing Y-drop vibrations during use.

According to a still further advantage yet of the present invention, rigid top tubes are secured to the top of the plate. One end of each tube connects to a splitter. The rigid tubes are resistant to breakage. Yet, they are easily replaceable if damage does occur. This is accomplished by removing the clips or clamps, and replacing the tubes as needed.

According to a still further advantage yet of the present invention, a barb can be formed in or added to the distal end of the rigid tubes. This aids in keeping the flexible tubes connected to the rigid tubes. A tube clamp can be used to secure the flexible tubes to the rigid tubes. The clamp can apply a clamping for above the barbs to prevent the flexible tubes from slipping off of the rigid tubes. The clamps are easily removable if flexible tube replacement is needed.

According to still further advantage yet of the present invention, internal pressure within the rigid tubes ensures that equal flow passes through each tube, regardless of angular orientation of the applicator. Further, the flexible tubes have a larger internal diameter than the rigid tubes. This results in the fertilizer draining from the flexible tubes without risk of an air lock.

According to a still further advantage yet of the present invention, the Y-drop is compact and will not interfere with other applicator components, even when folded.

According to a still further advantage yet of the present invention, it can be fitted to a variety of applicators, made by different manufacturers, without modification to that equipment. Related, since the invention is designed for use with existing coulters, the coulters are not removed. This eliminates the need to store the coulters and eliminates the risk of coulters being damaged during removal, storage and reinstallation. Further, the Y-drop can be attached adjacent to the knife using the same bolts used to secure the knife in place.

According to a still further advantage yet of the present invention, the riser and plate can be angularly offset by less than 90 degrees. This results in the plate being generally parallel (or nearly parallel) with the ground during applicator operation as the disc enters the ground to a predetermined depth.

Other advantages, benefits, and features of the present invention will become apparent to those skilled in the art upon reading the detailed description of the invention and studying the drawings.

BRIEF DESCRIPTION OF THE DRAWINGS

FIG. 14 is a chart showing a method of using an aspect of the present invention.

DETAILED DESCRIPTION OF PREFERRED EMBODIMENTS

Figure 1:
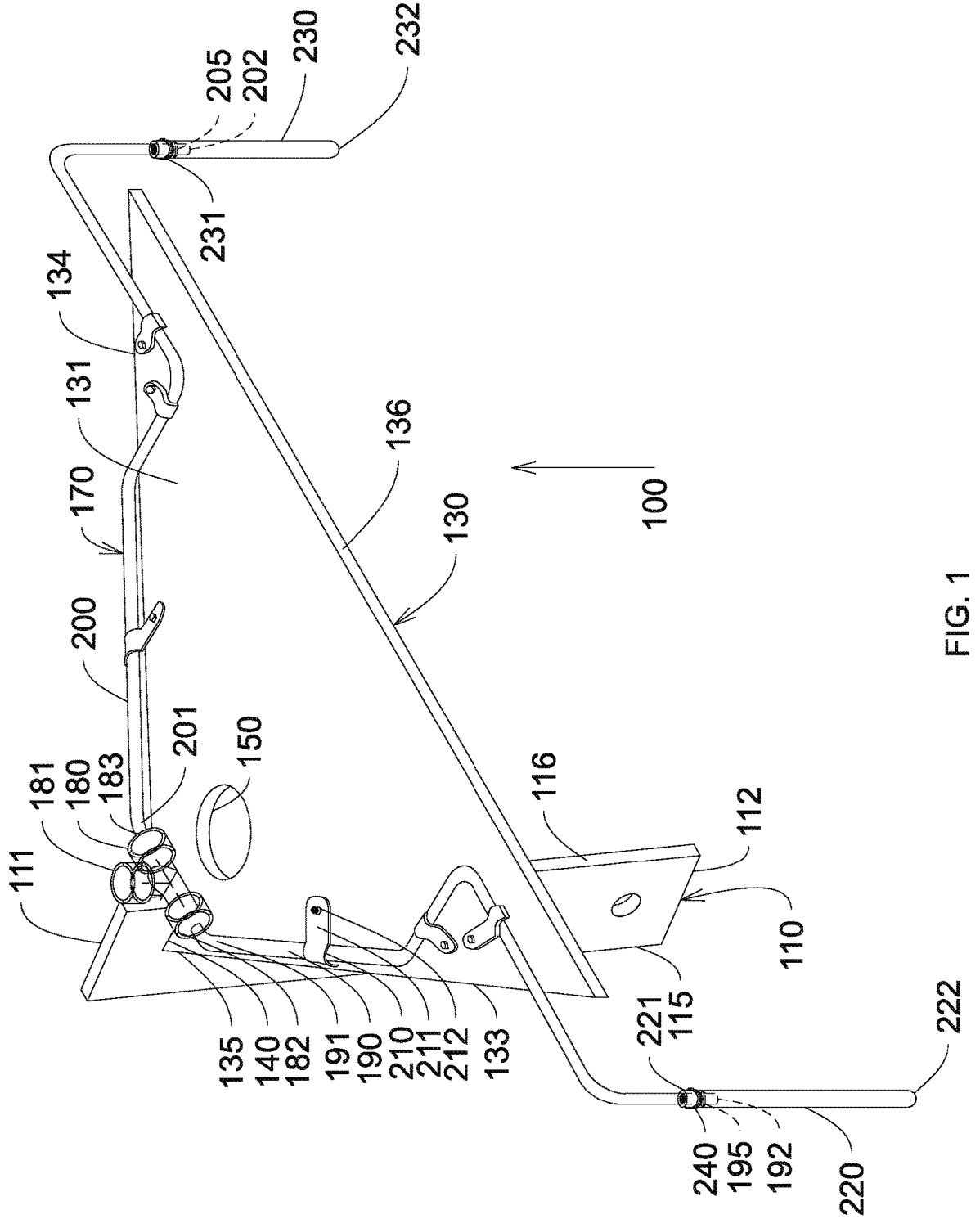
FIG. 1 is a perspective view of a Y-drop of the present invention.
Figure 2:
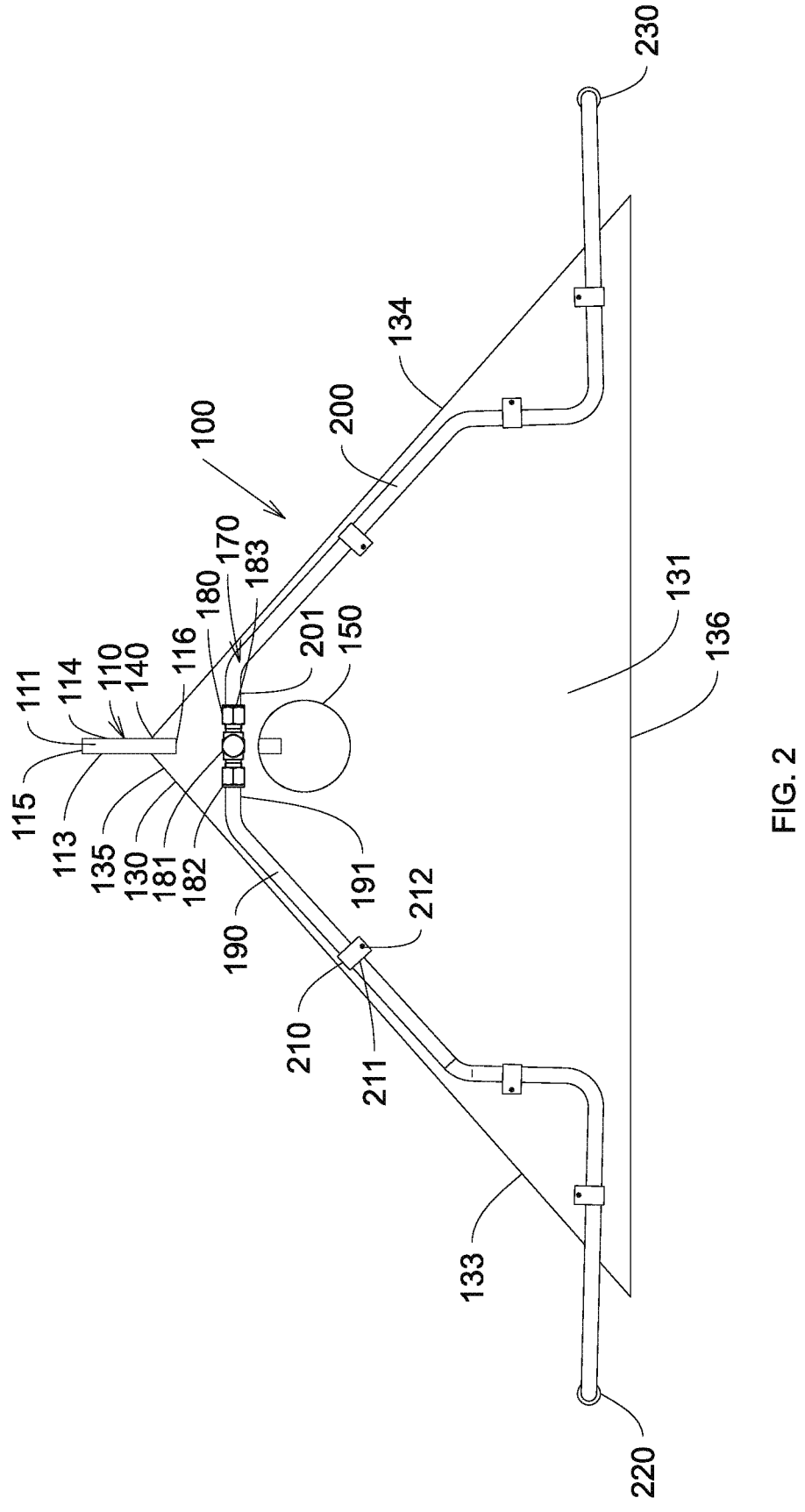
FIG. 2 is a top view of the embodiment illustrated in FIG. 1.
Figure 3:
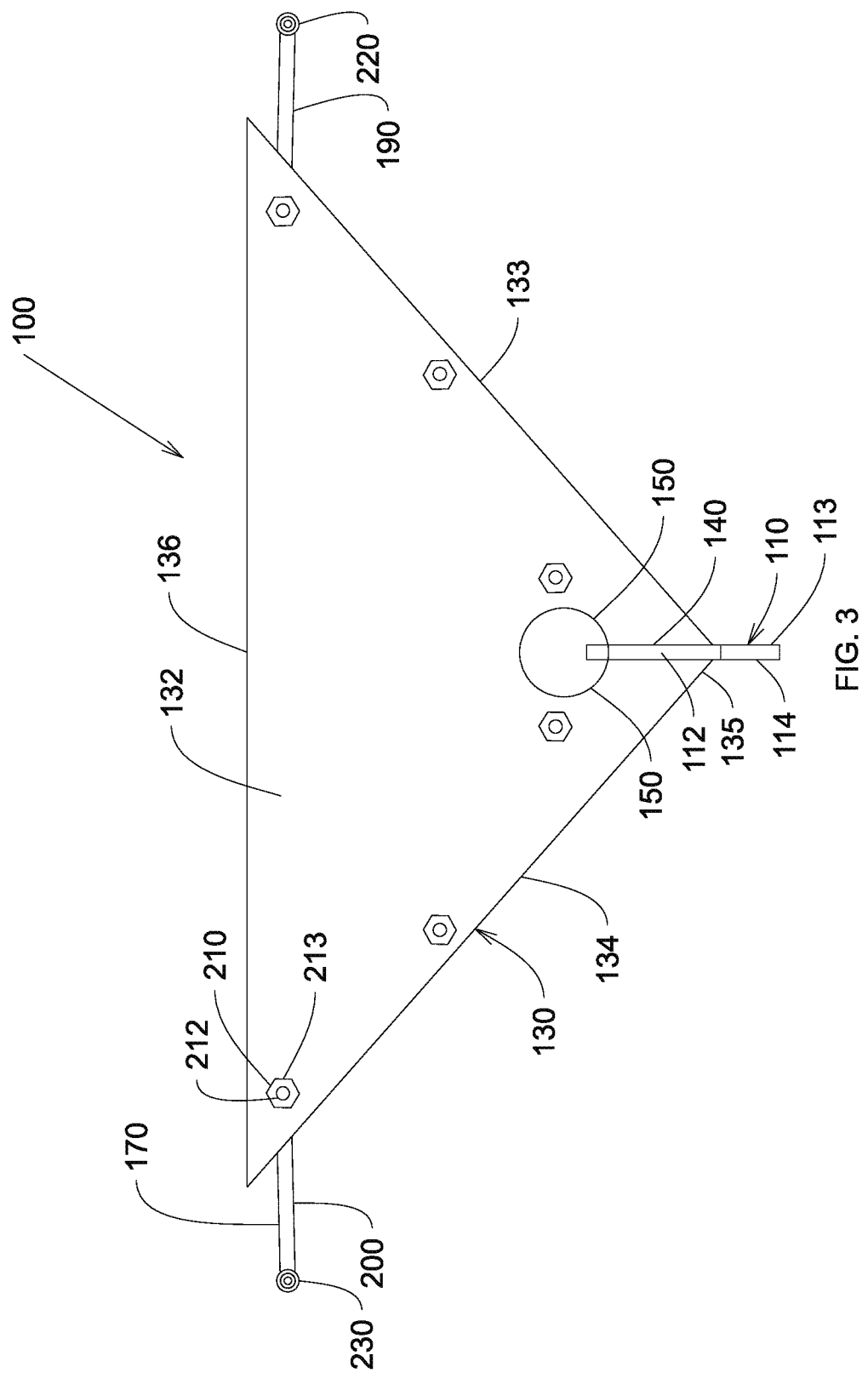
FIG. 3 is a bottom view of the embodiment illustrated in FIG. 1.
Figure 4:
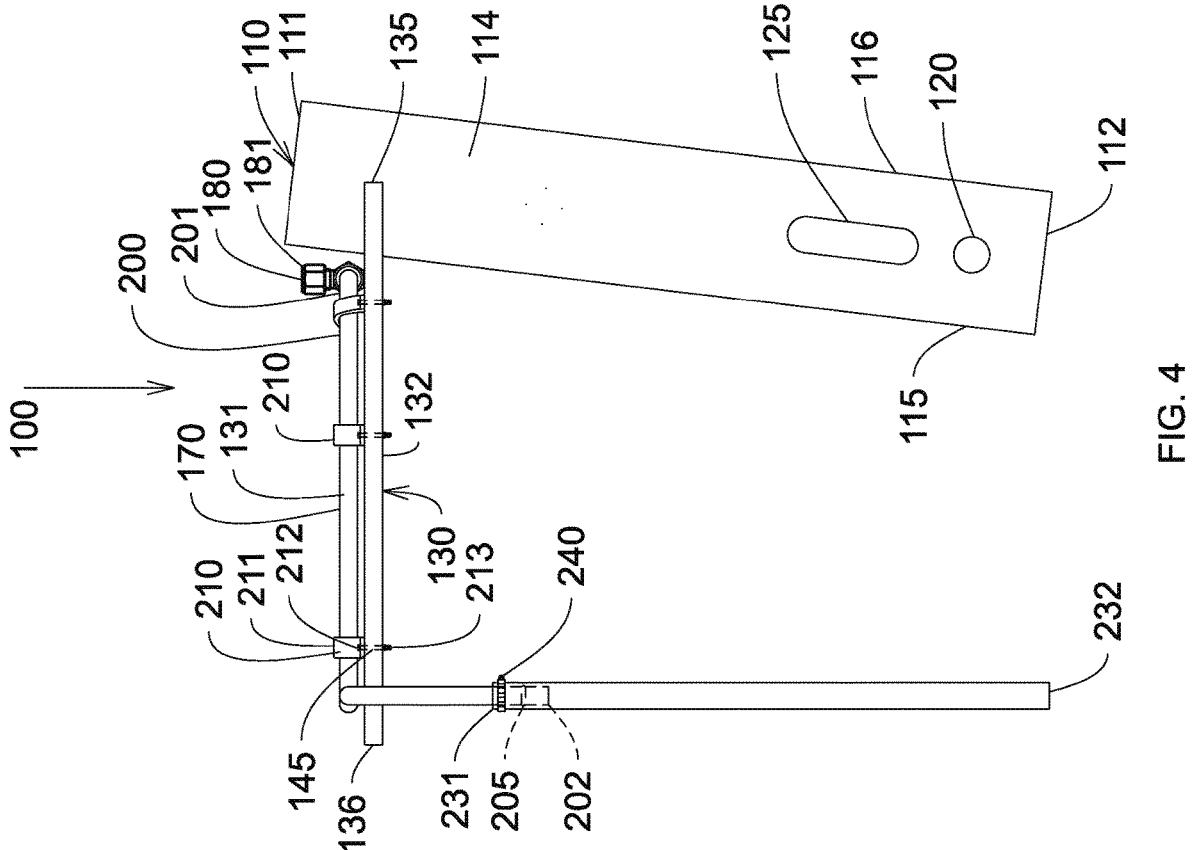
FIG. 4 is a side view of the embodiment illustrated in FIG. 1.
Figure 5:
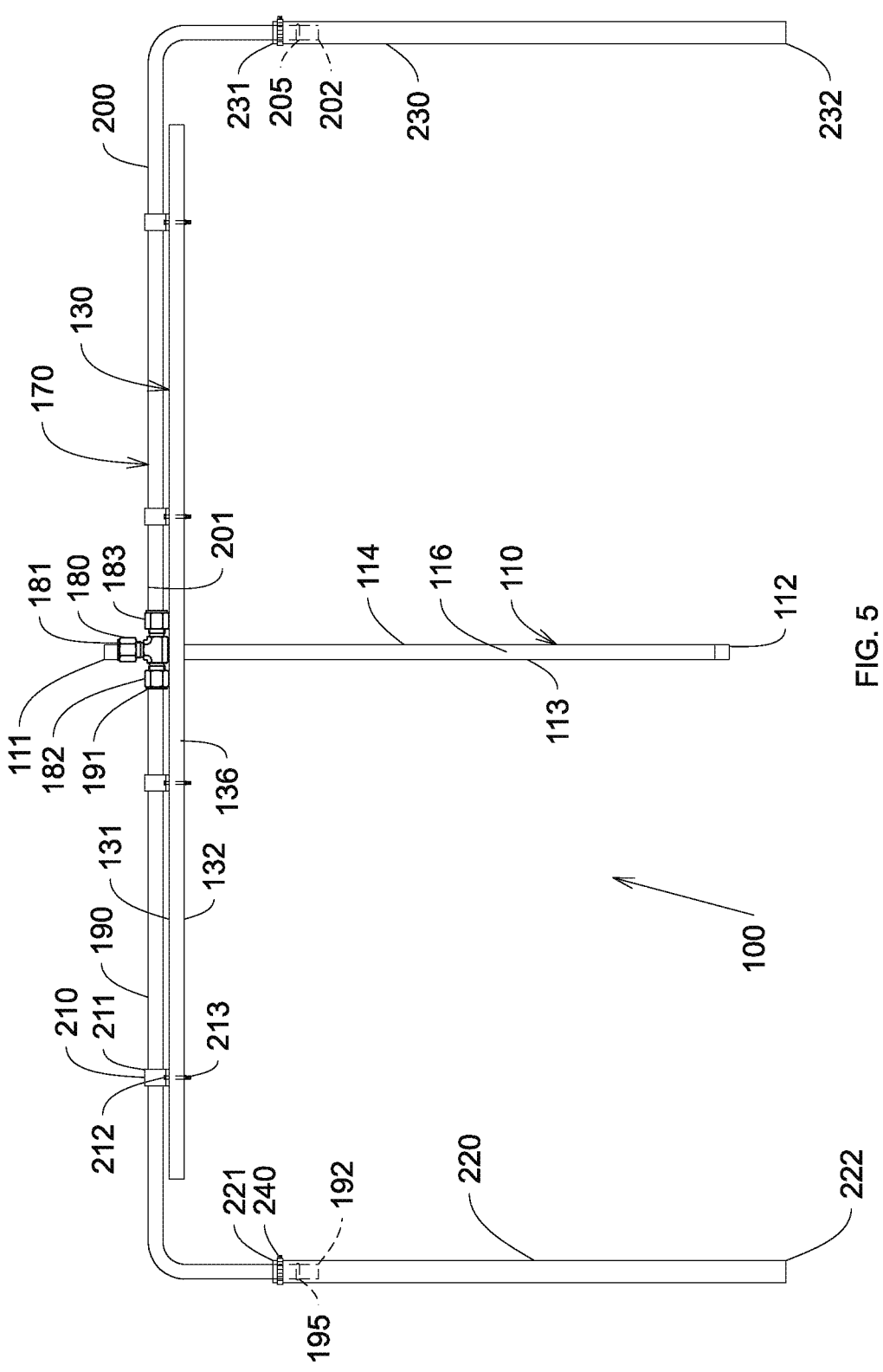
FIG. 5 is a rear view of the embodiment illustrated in FIG. 1.
Figure 6:
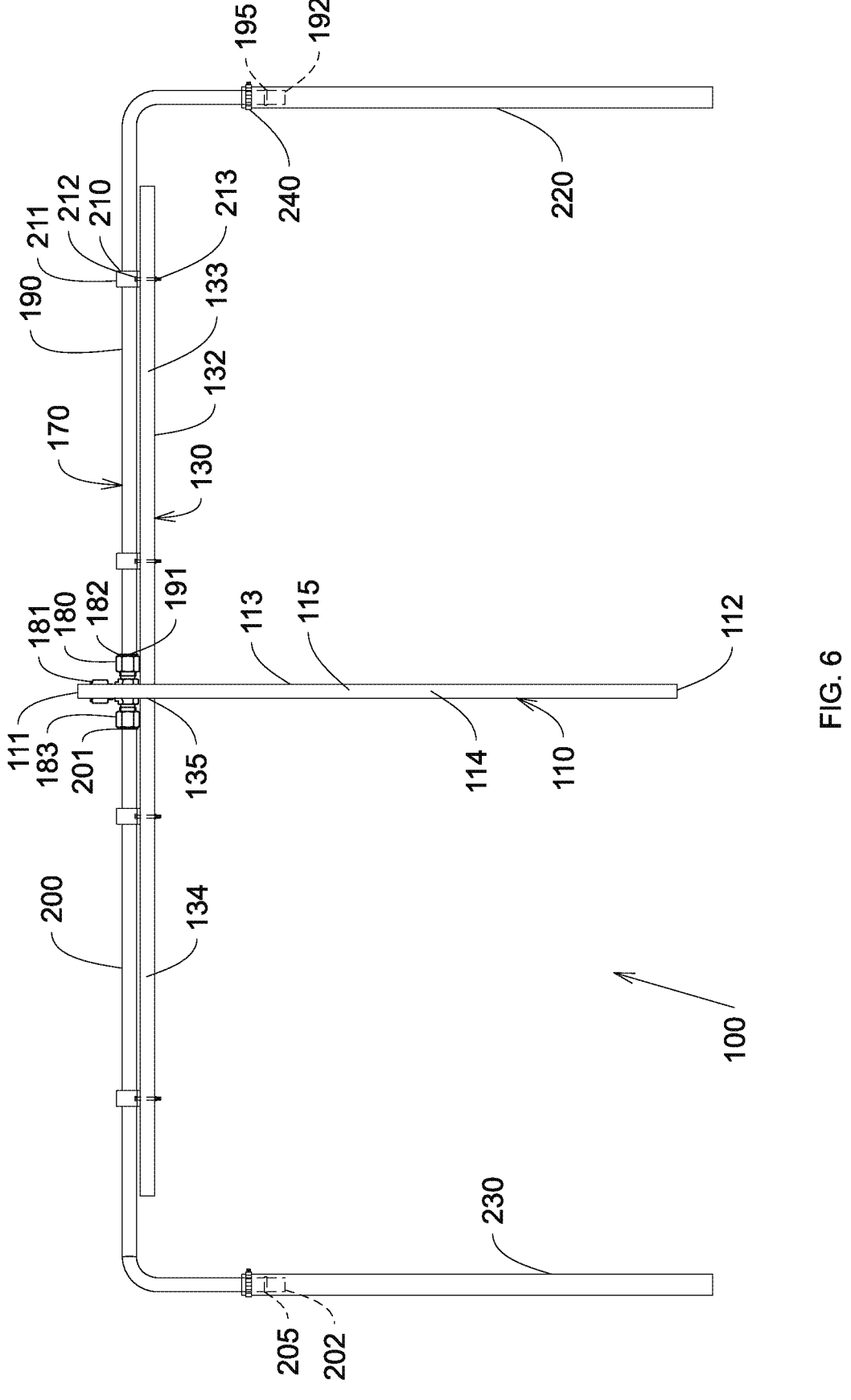
FIG. 6 is a front view of the embodiment illustrated in FIG. 1.
Figure 7:
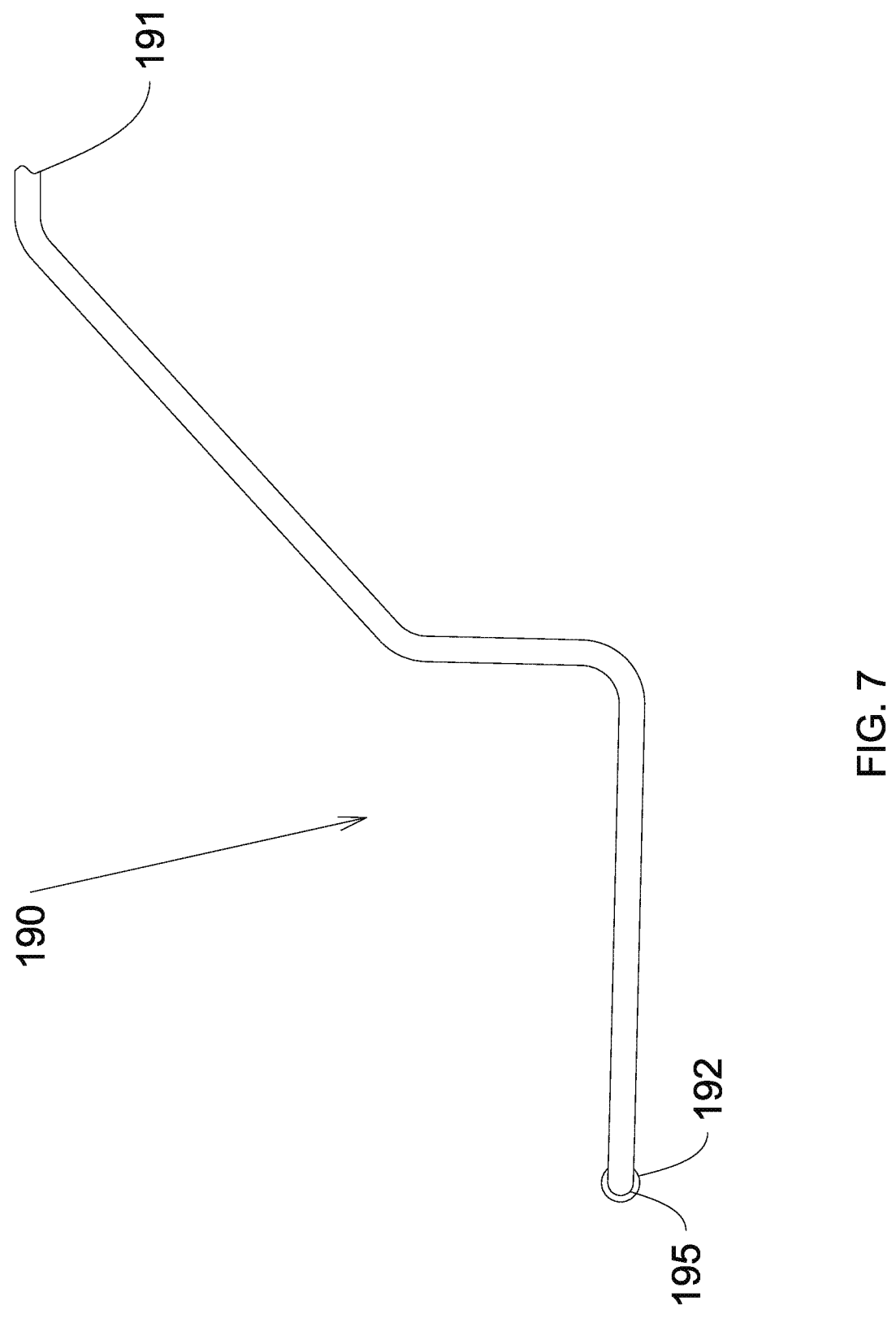
FIG. 7 is an isolation top view of an embodiment of a rigid tube.
Figure 8:
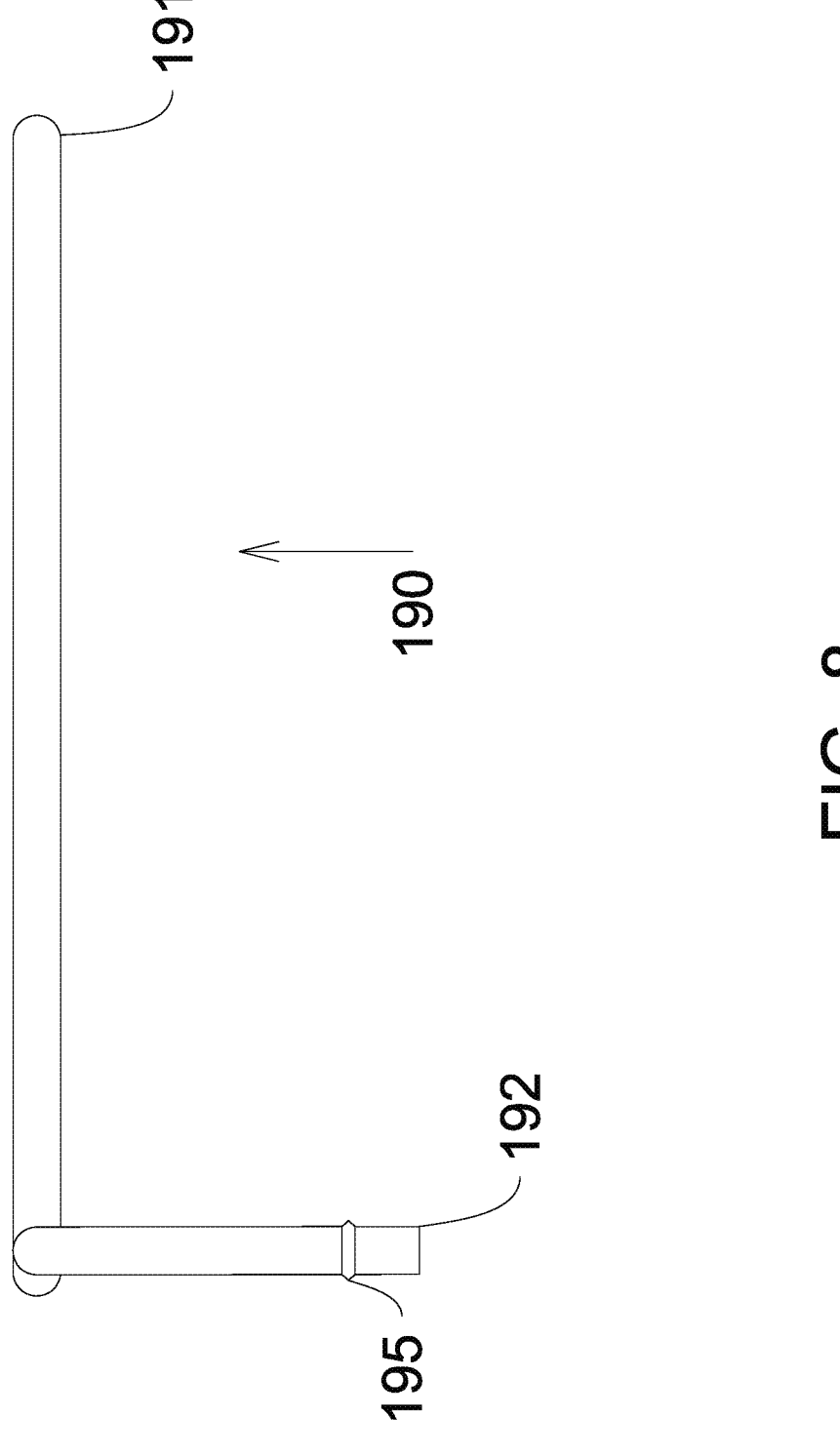
FIG. 8 is an isolation end view of the rigid tube of FIG. 7.
Figure 9:
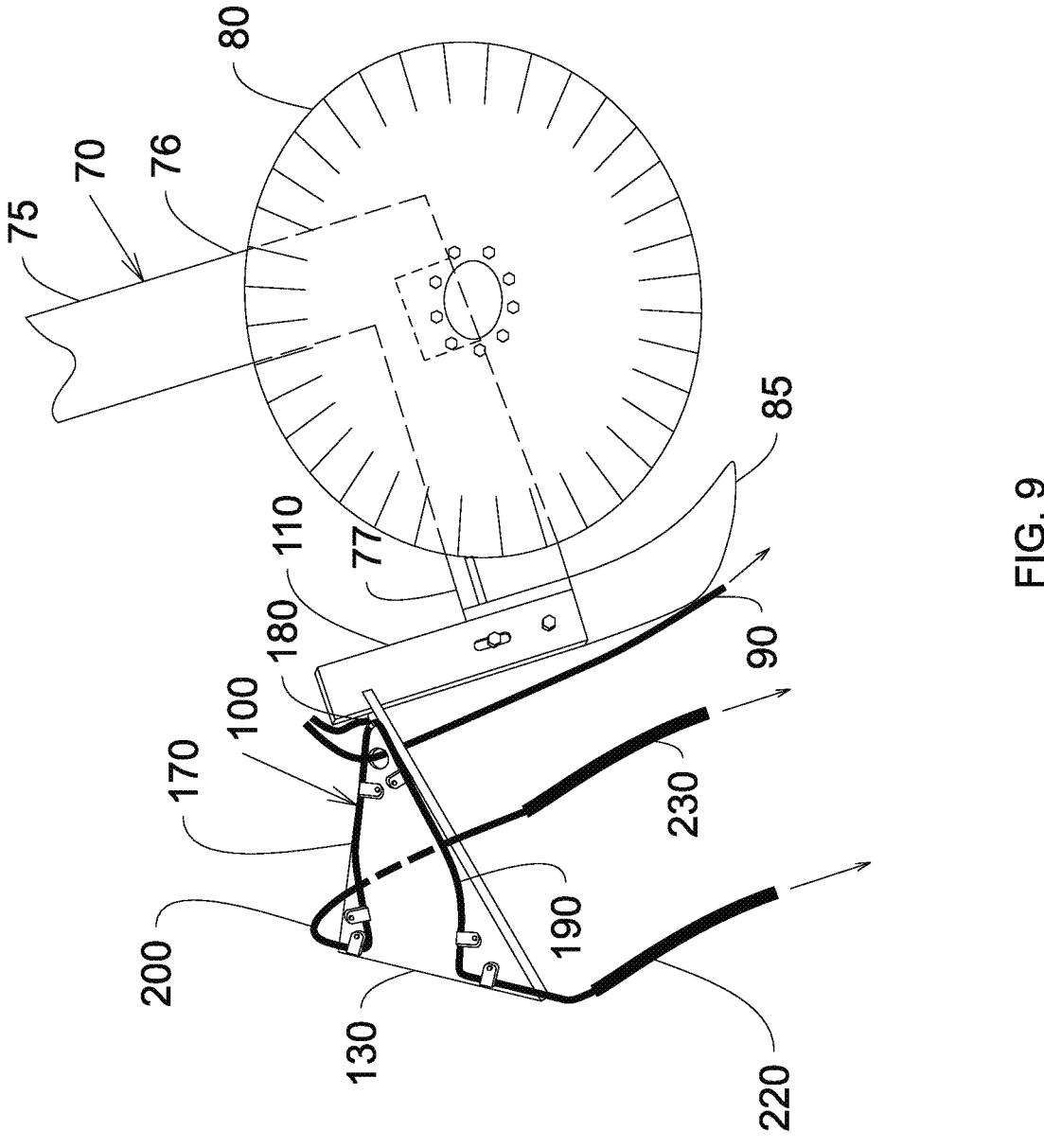
FIG. 9 is a side view showing the Y-drop mounted on the frame adjacent a knife.
Figure 10:
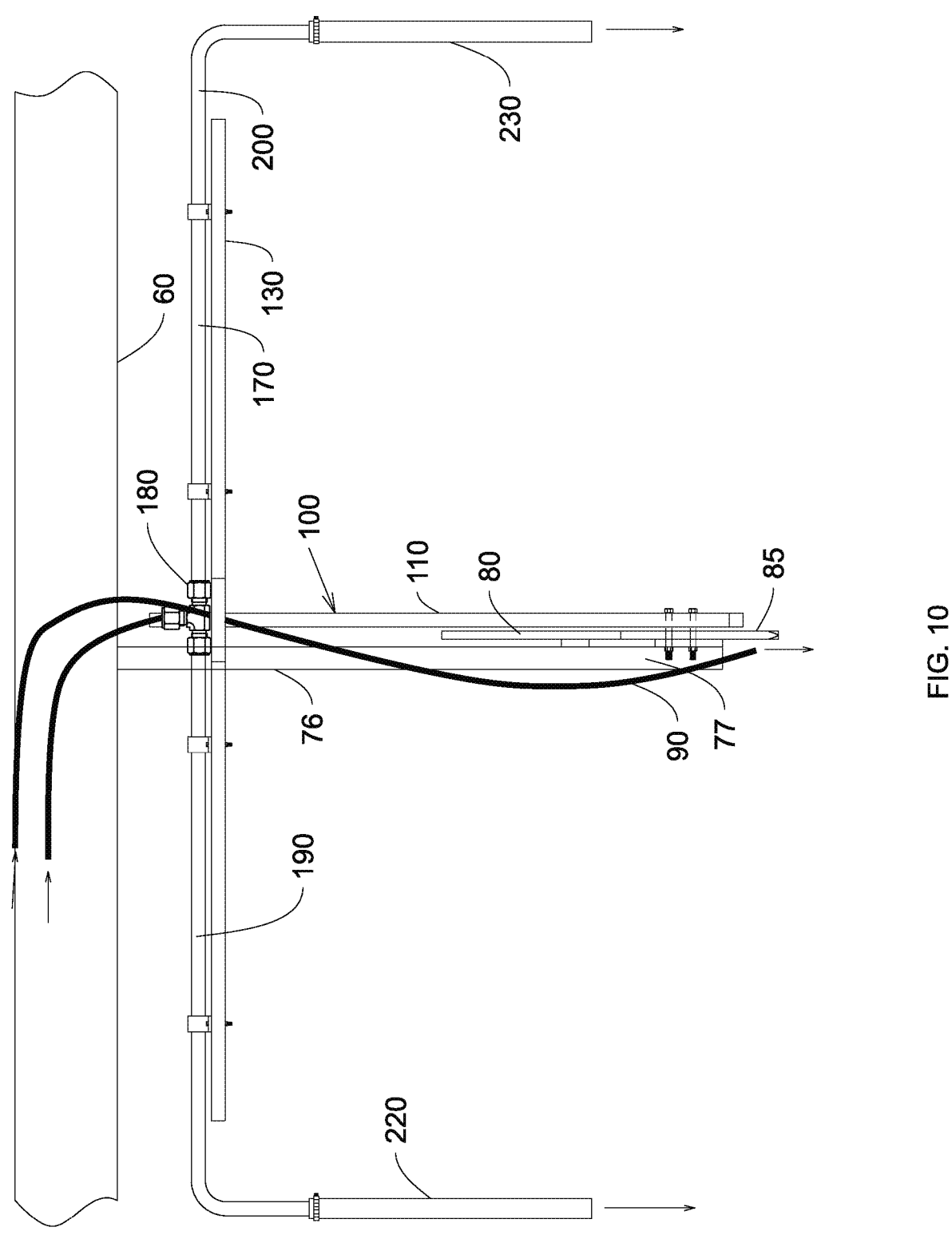
FIG. 10 is a rear view showing the Y-drop mounted on the applicator.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

The present invention can be used in a farm field 5 having a ground 6 with a crop 7 planted in rows 10. A tractor 20 can be provided to pull an applicator 50 through the field 5. The applicator 50 can be pulled by the tractor or integrated with the tractor. In this regard, the invention can be used either way. A basic applicator 50 has a reservoir 51, a pump 52, a valve assembly 53 and a beam 60. The beam 60 can be a singular fixed beam or can be comprised of a pair of pivotable beams that can be moved relative to the applicator body, such as for transport and storage. The beam can support several coulters 70, preferably several extending laterally on each side of the reservoir 50. There is not a preferred minimum or maximum number of coulters 70 that can be used. Each coulter 70 has a frame 75 with a vertical arm 76 and a horizontal arm 77 (or rear arm). The vertical arm 76 is connected to the beam 60. The horizontal arm 77 can be either fixedly or rotatably connected to the vertical arm 76. If rotatably connected, a spring preferably is present to bias the horizontal beam 77 to the horizontal position. A disc 80 can be supported by the horizontal arm. The user can determine the depth that the disc enters the ground during operation. A knife 85 can also be supported by the horizontal arm 77, preferably behind the disc. A liquid distribution tube 90 can be supported by the knife 85 to deliver fertilizer behind the knife. It is understood that an exemplary applicator 50 has been described and shown in FIG. 11, and that the present invention is not limited to the specifics of the applicator. To the contrary, the present invention is useful for applicators of many different types that support coulters. It is appreciated that while an 8 coulter system is illustrated, that more or fewer could be used without departing from the broad aspects of the present invention.

Turning now to FIGS. 1-11, it is seen that a preferred embodiment of a Y-drop 100 is illustrated. The Y-drop 100 has a riser 110, a plate 130 and a fertilizer delivery assembly 170. Each of these components will be described below.

The riser 110 has a top 111, a bottom 112, a first side 113, a second side 114, a front 115 and a rear 116. In a preferred embodiment, the riser 110 is made of steel. The riser can be made of another material without departing from the broad aspects of the present invention. In a preferred embodiment, the riser 110 is about 10.5 inches tall, about 2 inches front to back, and about ¼ inch wide. It is appreciated that other dimensions could be used without departing from the broad aspects of the present invention. A hole 120 is near the bottom 112 of the riser 110. The hole passes side 113 to side 114. A slot 125 is between the hole 120 and the top 111 of the riser. The slot is preferably located just above the hole. The slot 125 passes side 113 to side 114. The slot has a vertical axis that is aligned with a vertical axis of the riser 110. It is appreciated that the hole 120 and slot 125 are connection openings. There could be more or fewer connections openings without departing from the broad aspects of the present invention.

The plate 130 has a top 131, a bottom 132, a first side 133, a second side 134, a front 135 and a rear 136. In a preferred embodiment, the plate 130 is made of steel. The plate can be made of another material without departing from the broad aspects of the present invention. In a preferred embodiment, the plate 130 is approximately ¼ inch tall, about 18 inches wide at the rear 136. The plate preferably has a shape, when viewed from above, of an isosceles triangle (with the rear 136 as the base) with the two sides that are not the base being about 12 inches long. It is appreciated that other dimensions could be used without departing from the broad aspects of the present invention. A slot 140 is formed through the plate 130 between the top 131 and bottom 132 and being located at the front 135. Several holes 145 are formed through the plate 135 top to bottom for receiving fasteners 210. Fasteners 210 can be formed of a suitable structure that holds an item in position relative to the plate 130. In one embodiment, the fasteners 210 can have a clip 211, a bolt 212 and a nut 213. Other specific structures could be used without departing from the broad aspects of the present invention. A tube hole 150 is also provided through the plate 130 from the top 131 to bottom 132. The hole 150 preferably has a diameter of about 1.5 inches. The hole could be larger or smaller without departing from the broad aspects of the present invention. The hole 150 is preferably located behind the slot 140. The slot 140 and the center of the hole 150 are preferably aligned with the midpoint of the base, wherein the three lie on a line. The triangle plate 130 is preferably symmetrical about the line defined by the slot 140, hole center point and base midpoint.

The riser 110 is preferably fixed to the plate 130. This is accomplished by inserting the top 111 of the riser 110 into the slot 140 of the plate 130. The riser 110 can be welded in place, or fixed by another method. The riser 110 bottom 112 can be angled towards the back of the plate 130. In a preferred embodiment, the angle is approximately 80-85 degrees. The angle is more preferably between 82-83 degrees. Having an angled relationship between the riser 110 and plate 130 results in the plate 130 being generally in plane with the ground during operation as the disc 80 of the coulter passes below the surface of the field.

The fertilizer delivery assembly 170 preferably has a splitter 180, a tube 190, a tube 200, a flexible tube 220 and a flexible tube 230. Each of these components are described in detail below.

The splitter 180 has one inlet 181 and two outlets 182 and 183. In a preferred embodiment, the splitter 180 has a general "T" shape. The splitter can be made of plastic or another suitable material.

Tube 190 has a first end 191 and a second end 192. A barb is near or at end 192. Tube 190 is preferably a rigid tube made of stainless steel. The tube can be made from other corrosion resistant materials without departing from the broad aspects of the present invention. There are several bends between the ends. One of the bends is a right-angle bend. In this regard, end 191 has a first end axis and end 192 has a second end axis, wherein the second end axis is perpendicular to the first end axis. End 191 is preferably sealably connected to outlet 182 of the splitter. End axis of end 191 is preferably parallel to a plate top plane. The tube 190 is preferably removably fixed to the plate 130 with fasteners 210. Preferably three fasteners 210 are used to removably secure the tube 190 to the plate 130. The fasteners can be removed for tube replacement. End 192 of the tube 190 depend below the bottom of the plate 130. End axis of end 192 is preferably perpendicular to a plate bottom plane. Tube 190 preferably has an inside diameter of about 3⁄16 inch and an outside diameter of about ¼ inch. These dimensions could be altered without departing from the broad aspects of the present invention.

Tube 200 has a first end 201 and a second end 202. A barb is near or at end 202. Tube 200 is preferably a rigid tube made of stainless steel. The tube can be made from other corrosion resistant materials without departing from the broad aspects of the present invention. There are several bends between the ends. One of the bends is a right-angle bend. In this regard, end 201 has a first end axis and end 202 has a second end axis, wherein the second end axis is perpendicular to the first end axis. End 201 is preferably sealably connected to outlet 183 of the splitter. End axis of end 201 is preferably parallel to a plate top plane. The tube 200 is preferably removably fixed to the plate 130 with fasteners 210. Preferably three fasteners 210 are used to removably secure the tube 200 to the plate 130. The fasteners can be removed for tube replacement. End 202 of the tube 200 depend below the bottom of the plate 130. End axis of end 202 is preferably perpendicular to a plate bottom plane. Tube 200 preferably has an inside diameter of about 3⁄16 inch and an outside diameter of about ¼ inch. These dimensions could be altered without departing from the broad aspects of the present invention.

Ends 192 and 202 of the tubes 190 and 200 are in one embodiment preferably spaced apart approximately 22 inches plus or minus ½ inch, which allows fertilizer to be applied to facing sides of two adjacent crop rows that are spaced about 30 inches on center. It is appreciated that the invention could be alternatively sized so that any desired overall width between the tubes could be provided. Pressure is developed within the tubes, on account of internal diameter size, so that the flow rate through each tube is the same regardless of application orientation with a horizontal plane.

A flexible tube 220 is provided. Tube 220 is preferably made of plastic. The tube 220 has a first end 221 and a second end 222. The tube has an inside diameter that is preferably slightly larger than the outside diameter of rigid tube 190. In this regard, the end 221 can be slid over the end of tube 190 past the barb 195, and a clamp 240 can be used to removably secure the flexible tube 220 to the rigid tube 190. The flexible tube is preferably about 10 to 12 inches long if the user runs the applicator with a two inch disc depth, and preferably hangs straight down during operation. The length of the flexible tubes can be determined by the end user, who can optionally shorten the tubes. Shorter tubes will be desired with increases in disc depth into the ground.

A flexible tube 230 is provided. Tube 230 is preferably made of plastic. The tube 230 has a first end 231 and a second end 232. The tube has an inside diameter that is preferably slightly larger than the outside diameter of rigid tube 200. In this regard, the end 231 can be slid over the end of tube 200 past the barb 205, and a clamp 240 can be used to removably secure the flexible tube 230 to the rigid tube 200. The flexible tube is preferably about 10 to 12 inches long if the user runs the applicator with a two inch disc depth, and preferably hangs straight down during operation. The length of the flexible tubes can be determined by the end user, who can optionally shorten the tubes. Shorter tubes will be desired with increases in disc depth into the ground.

It is appreciated that with the dimensions provided herein, fertilizer can be applied at a rate of about 5 gallon per side per acre. Other application rates can be used by varying pressures and/or component dimensions.

The Y-drop can be installed to existing systems without making modifications to the existing applicator systems. In in this regard, the Y-drop converts the existing coulter delivered applicator to a dual delivery system. The Y-drop is preferably mounted to the coulter using the same bolts that are used to secure the knife 85. In this regard, the Y-drop is mounted to the rear arm 77 of coulter 70. The plate 130 is elevated over the knife 85, and the flexible tubes depend below the plate and are in position to accurately apply fertilizer adjacent crop rows 10.

Existing liquid distribution tube 90 can pass through the hole 159 in the plate adjacent the plate front 135.

Valving 53 can be provided for switching between application via the knife port, via the Y-drop tubes, both, or neither.

Figure 11:
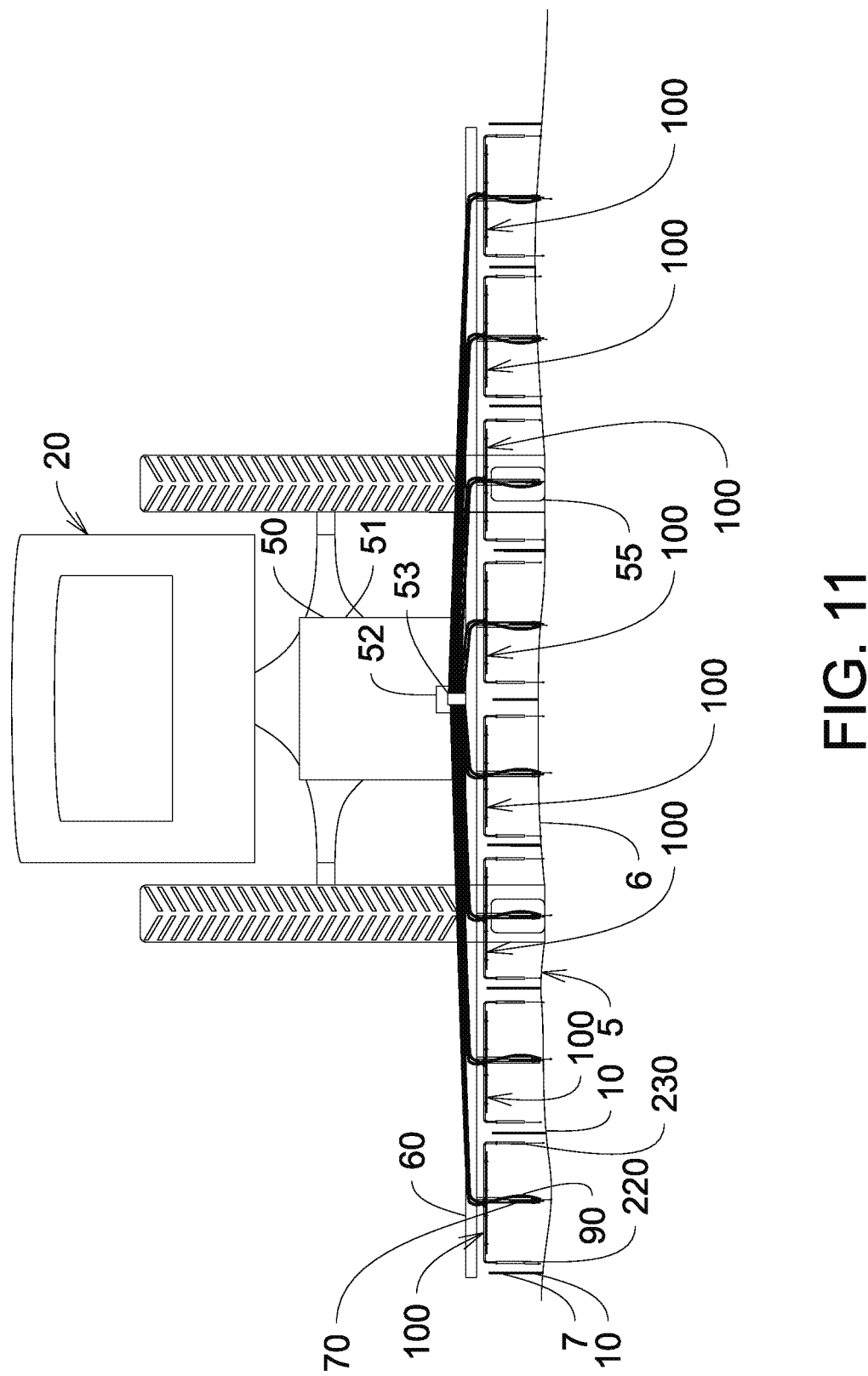
FIG. 11 is a schematic view showing the several Y-drops mounted on an applicator.

Looking at FIG. 11, it is seen that there is preferably a Y-drop 100 attached to each coulter.

It is appreciated that there are several unique structural features according to various aspects of the present invention. These features can be utilized individually or combined with other features in any possible way, such as being coupled with other features, tripled with other features and/or used all together without departing from the broad aspects of the present invention. For example, each of the following features could be used individually or in any manner of combination:

A Y-drop for an applicator, said Y-drop comprising: a riser; a plate, said plate having a hole allowing a tube to pass therethrough; and a fertilizer delivery assembly, said fertilizer assembly being supported by said plate. This allows the Y-drop to be incorporated into existing systems.

A Y-drop for an applicator having an applicator frame, said Y-drop comprising: a riser, said riser having a riser top and a riser bottom, said riser having at least one connection opening therethrough; a plate having a plate front and a plate rear, said plate front having a slot formed therein, said riser top being connected to said plate in said slot; and a fertilizer delivery assembly, said fertilizer assembly being supported by said plate. This allows the riser to be securely connected to the plate in a symmetric manner, among other advantages.

A Y-drop for an applicator with an applicator frame, said Y-drop comprising: a riser, said riser having a riser top and a riser bottom; a plate having a plate front, a plate rear, a plate first side and a plate second side, said riser being connected to said plate at said plate front; and a fertilizer delivery assembly supported by said plate, said fertilizer delivery assembly having a first flexible tube depending down adjacent said plate first side at said plate rear, and a second flexible tube depending down adjacent said second plate side at said plate rear. This allows the plate to be at a selected elevation to clear obstructions and to have flexible depending tubes precisely delivery fertilizer, which can deflect if they encounter an obstruction, among other advantages.

A Y-drop for an applicator having an applicator frame, said Y-drop comprising: a riser; a plate, said riser and said plate being fixedly joined together at an angle of between 80 and 85 degrees; and a fertilizer delivery assembly supported by said plate. This allows the plate to be generally parallel to the ground when the disc and knife are at their selected operational depths.

Each of these structures can also be combined with each other and/or with one or more of the following features: having a triangular shaped plate; having a riser with two connection holes, one of the two holes being a riser slot; having a riser slot axis that is generally parallel to the riser vertical axis; having a riser that is about 10.5 inches tall; having a plate lie in a plate plane the riser lie in a riser plane, the plate plane being generally perpendicular to the riser plane; and the fertilizer delivery assembly having rigid tubes each with a right angle so that their respective distal ends are generally perpendicular to the plate plane.

Figure 12:
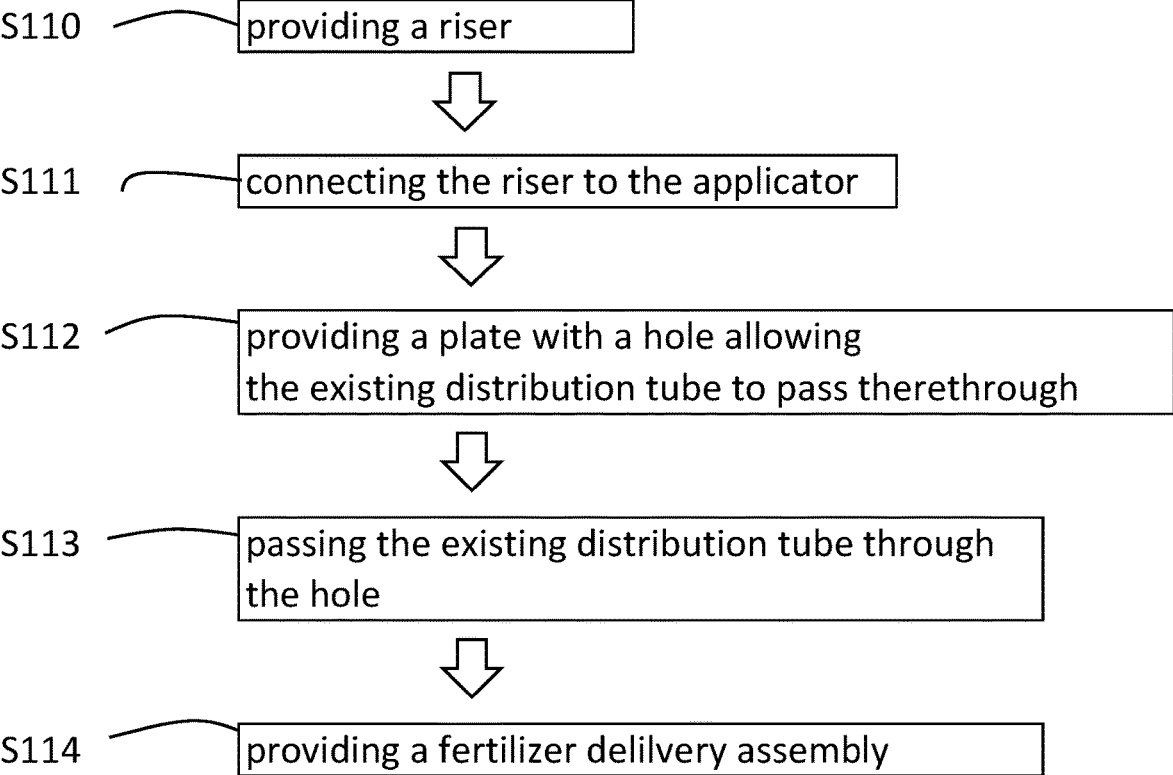
FIG. 12 is a chart showing a method of using an aspect of the present invention.

It is further appreciated that there are several unique method features according to the present invention. These features can be utilized individually or combined with other features in any possible way, such as being coupled with other features, tripled with other features and/or used all together without departing from the broad aspects of the present invention. For example, each of the following method features could be used individually or in any manner of combination:

As seen in FIG. 12, a unique method is a method of using a Y-drop with an applicator having an existing distribution tube, said method comprising: providing a riser (Step 110); connecting the riser to the applicator (Step S111); providing a plate, said plate having a hole allowing the existing distribution tube to pass therethrough (Step S112); passing the existing distribution tube through the hole (Step S113); and providing a fertilizer delivery assembly (Step S114).

Figure 13:
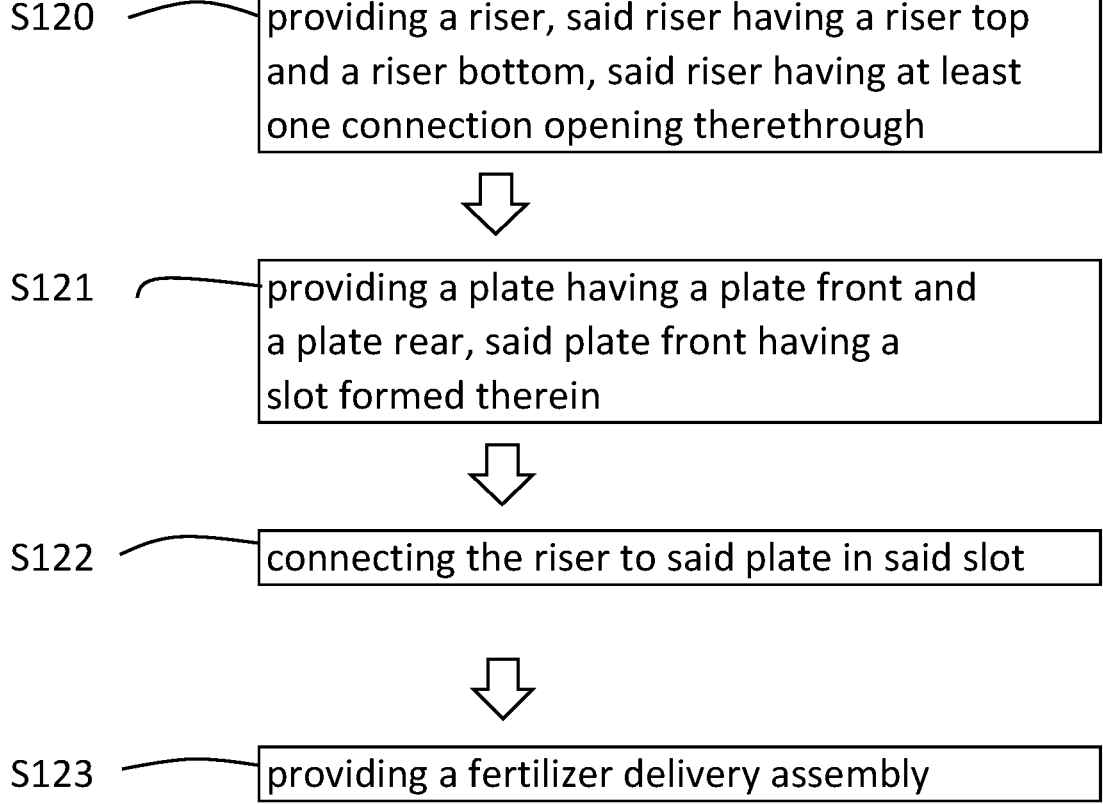
FIG. 13 is a chart showing a method of using an aspect of the present invention.

As seen in FIG. 13, another unique method is a method of using a Y-drop for an applicator, the method comprising the steps: providing a riser, said riser having a riser top and a riser bottom, said riser having at least one connection opening therethrough (Step S120); providing a plate having a plate front and a plate rear, said plate front having a slot formed therein (Step S121); connecting the riser to said plate in said slot (Step S122); and providing a fertilizer delivery assembly (Step S123).

As seen in FIG. 14, another unique method is a method of using a Y-drop for an applicator with an applicator frame, said method comprising the steps of: providing a riser, said riser having a riser top and a riser bottom (Step S130); mounting said riser to said applicator frame at said riser bottom (Step S131); providing a plate having a plate front, a plate rear, a plate first side and a plate second side, said riser being connected to said plate at said plate front (Step S132); and providing a fertilizer delivery assembly, said fertilizer delivery assembly having a first flexible tube depending down adjacent said plate first side at said plate rear, and a second flexible tube depending down adjacent said second plate side at said plate rear (Step S133).

Figure 15:
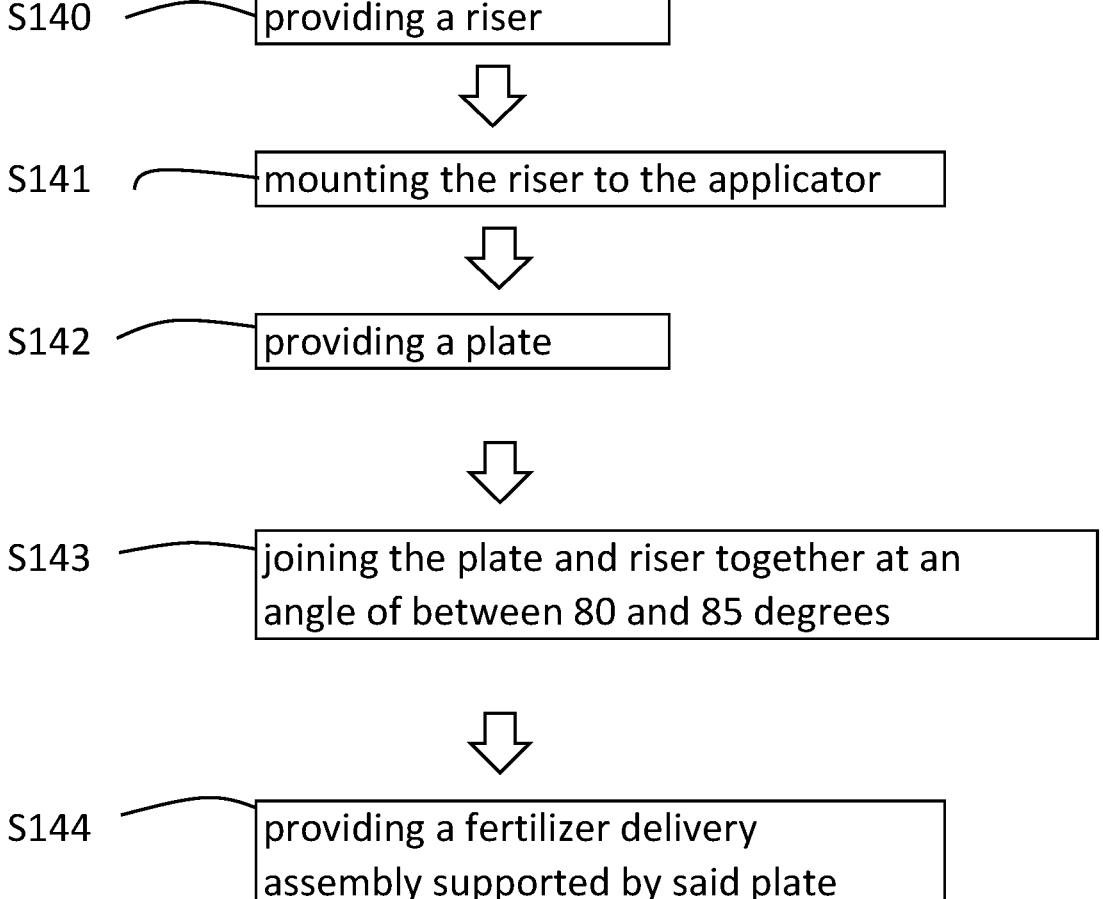
FIG. 15 is a chart showing a method of using an aspect of the present invention.

As seen in FIG. 15, another unique method is a method of using a Y-drop for an applicator, said method comprising the steps: providing a riser (Step S140); mounting the riser to the applicator (Step S141); providing a plate (Step S142); joining the plate and riser together at an angle of between 80 and 85 degrees (Step S143); and providing a fertilizer delivery assembly supported by said plate (Step S144).

Each of these methods can also be combined with each other and/or with one or more of the following methods: providing a triangular shaped plate; providing a riser with two connection holes, one of the two holes being a riser slot; providing a riser slot axis that is generally parallel to the riser vertical axis; providing a riser that is about 10.5 inches tall; providing a plate that lies in a plate plane a riser that lies in a riser plane, the plate plane being generally perpendicular to the riser plane; providing the fertilizer delivery assembly with rigid tubes each with a right angle so that their respective distal ends are generally perpendicular to the plate plane.

Thus, it is apparent that there has been provided, in accordance with the invention, a Y-drop attachment for an agricultural applicator and methods of use thereof that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A Y-drop for an applicator, said Y-drop comprising:
a riser having a riser top and a riser bottom;
a plate comprising a plate front and a plate rear, said plate having a hole allowing a tube to pass therethrough, and said plate having a slot at said plate front, said riser top being fixed to said plate within said slot; and
a fertilizer delivery assembly, said fertilizer delivery assembly being supported by said plate,
wherein:
said riser has at least one connection opening therethrough, and said riser being mounted to the applicator near said riser bottom;
said plate has a plate first side and a plate second side, said plate and said riser being fixedly joined together at an angle of between 80 and 85 degrees; and
said plate lies in a plate plane and said riser lies in a riser plane, said plate plane being generally perpendicular to said riser plane.

2. The Y-drop of claim 1 wherein said plate has a triangular shape.

3. The Y-drop of claim 1 wherein said hole passes through said plate at a center of said plate.

4. The Y-drop of claim 1 wherein said fertilizer delivery assembly has a first rigid tube with a first rigid tube first end and a first rigid tube second end, said first rigid tube second end being perpendicular to said first rigid tube first end, said fertilizer delivery assembly further has a second rigid tube with a second rigid tube first end and a second rigid tube second end, said second rigid tube second end being perpendicular to said second rigid tube first end, and said fertilizer delivery assembly further has a first flexible tube depending down adjacent said plate first side at said plate rear from said first rigid tube, and a second flexible tube depending down adjacent said second plate side at said plate rear from said second rigid tube, and
wherein the first rigid tube and the second rigid tube are connected to a plate top and wherein the first rigid tube first end and the second rigid tube first end are parallel to said plate top.

5. A Y-drop for an applicator having an applicator frame, said Y-drop comprising:
a riser, said riser having a riser top and a riser bottom, said riser having at least one connection opening therethrough;
a plate having a plate front and a plate rear, said plate front having a slot formed therein, said riser top being fixedly connected to said plate in said slot above the connection opening; and
a fertilizer delivery assembly, said fertilizer assembly being supported by said plate,
wherein:
said plate has a hole allowing a tube to pass therethrough;
said plate has a plate first side and a plate second side;
said fertilizer delivery assembly has a first flexible tube depending down adjacent said plate first side at said plate rear, and a second flexible tube depending down adjacent said second plate side at said plate rear; said fertilizer delivery assembly further having a first rigid tube with a first rigid tube first end and a first rigid tube second end, said first rigid tube second end being perpendicular to said first rigid tube first end, said fertilizer delivery assembly further has a second rigid tube with a second rigid tube first end and a second rigid tube second end, said second rigid tube second end being perpendicular to said second rigid tube first end, wherein said first flexible tube is removably connected to said first rigid tube and said second flexible tube is removably connected to said second rigid tube, and
the first rigid tube and the second rigid tube are connected to a plate top and wherein the first rigid tube first end and the second rigid tube first end are parallel to said plate top.

6. The Y-drop of claim 5 said riser and said plate are fixedly joined together at an angle of between 80 and 85 degrees.

7. The Y-drop of claim 5 wherein said slot is centered on said plate between a plate first side and a plate second side.

8. The Y-drop of claim 5 wherein said plate lies in a plate plane and said riser lies in a riser plane, said plate plane being generally perpendicular to said riser plane.

9. A Y-drop for an applicator with an applicator frame, said Y-drop comprising:
a riser, said riser having a riser top and a riser bottom;
a plate having a plate front, a plate rear, a plate first side, a plate second side, a plate top and a plate bottom, said riser top being fixedly connected to said plate at said plate front;
a fertilizer delivery assembly supported by said plate, said fertilizer delivery assembly having a first flexible tube depending down adjacent said plate first side at said plate rear, and a second flexible tube depending down adjacent said second plate side at said plate rear,
wherein:
said fertilizer delivery assembly further has a first rigid tube with a first rigid tube first end and a first rigid tube second end, said first rigid tube second end being perpendicular to said first rigid tube first end, said fertilizer delivery assembly further has a second rigid tube with a second rigid tube first end and a second rigid tube second end, said second rigid tube second end being perpendicular to said second rigid tube first end;
said first flexible tube is removably connected to said first rigid tube,
said second flexible tube is removably connected to said second rigid tube,
the first rigid tube and the second rigid tube are connected to said plate top, and
the first rigid tube first end and the second rigid tube first end are parallel to said plate top.

10. The Y-drop of claim 9 wherein said plate has a hole allowing a tube to pass therethrough.

11. The Y-drop of claim 9 wherein:
said riser has two connection holes, one of said two connection holes being a riser slot, said riser slot has a riser slot axis that is generally parallel to a riser vertical axis; and
said plate lies in a plate plane and said riser lies in a riser plane, said plate plane being generally perpendicular to said riser plane.

12. The Y-drop of claim 9 wherein:
said plate front having a slot formed therein, said riser being connected to said plate in said slot; and
said riser and said plate are fixedly joined together at an angle of between 80 and 85 degrees.

13. A Y-drop for an applicator having an applicator frame, said Y-drop comprising:
a riser having a riser top and a riser bottom, said riser being selectively connectable to the applicator frame;
a plate, said riser and said plate being fixedly joined together at an angle of between 80 and 85 degrees; and a fertilizer delivery assembly supported by said plate,
wherein said plate lies in a plate plane and said riser lies
in a riser plane, the riser plane being perpendicular to
the plate plane,
wherein said riser further has two connection holes, one
of said two connection holes being a riser slot with a
riser slot axis that is generally parallel to a riser vertical
axis, said riser being mountable to the applicator frame
at said riser bottom.

14. The Y-drop of claim 13 wherein:
said plate has a plate front, a plate rear, a plate first side
and a plate second side, said plate front having a slot
formed therein, said riser being connected to said plate
at said plate front in said slot.

15. The Y-drop of claim 13 wherein said plate has a
triangular shape and a hole allowing a tube to pass there-
through.

16. The Y-drop of claim 13 wherein said fertilizer delivery
assembly has a first rigid tube with a first rigid tube first end
and a first rigid tube second end, said first rigid tube second
end being perpendicular to said first rigid tube first end, said
fertilizer delivery assembly further has a second rigid tube
with a second rigid tube first end and a second rigid tube
second end, said second rigid tube second end being per-
pendicular to said second rigid tube first end, and said
fertilizer delivery assembly further has a first flexible tube
depending down adjacent said plate first side at said plate
rear from said first rigid tube, and a second flexible tube
depending down adjacent said second plate side at said plate
rear from said second rigid tube,
wherein the first rigid tube and the second rigid tube are
connected to said plate top and wherein the first rigid
tube first end and the second rigid tube first end are
parallel to said plate plane.

17. A Y-drop for an applicator, said Y-drop comprising:
a riser;
a plate, said plate having a hole allowing a tube to pass
therethrough; and
a fertilizer delivery assembly, said fertilizer assembly
being supported by said plate,
wherein:
said riser has a riser top and a riser bottom, said riser
has at least one connection opening therethrough,
and said riser being mounted to the applicator near
said riser bottom;
said plate has a plate front, a plate rear, a plate first side
and a plate second side, said plate front having a slot
formed therein, said riser being connected to said
plate in said slot, said plate and said riser being
fixedly joined together at an angle of between 80 and
85 degrees; and
said plate lies in a plate plane and said riser lies in a
riser plane, said plate plane being generally perpen-
dicular to said riser plane.

18. A Y-drop for an applicator, said Y-drop comprising:
a riser having a riser top and a riser bottom;
a plate comprising a plate front and a plate rear, said plate
having a hole allowing a tube to pass therethrough, and
said plate having a slot at said plate front, said riser top
being fixed to said plate within said slot; and
a fertilizer delivery assembly, said fertilizer delivery
assembly being supported by said plate,
wherein said fertilizer delivery assembly has a first rigid
tube with a first rigid tube first end and a first rigid tube
second end, said first rigid tube second end being
perpendicular to said first rigid tube first end, said
fertilizer delivery assembly further has a second rigid
tube with a second rigid tube first end and a second
rigid tube second end, said second rigid tube second
end being perpendicular to said second rigid tube first
end, and said fertilizer delivery assembly further has a
first flexible tube depending down adjacent said plate
first side at said plate rear from said first rigid tube, and
a second flexible tube depending down adjacent said
second plate side at said plate rear from said second
rigid tube, and
wherein the first rigid tube and the second rigid tube are
connected to a plate top and wherein the first rigid tube
first end and the second rigid tube first end are parallel
to said plate top.

19. A Y-drop for an applicator having an applicator frame,
said Y-drop comprising:
a riser having a riser top and a riser bottom, said riser
being selectively connectable to the applicator frame;
a plate, said riser and said plate being fixedly joined
together at an angle of between 80 and 85 degrees; and
a fertilizer delivery assembly supported by said plate,
wherein said plate lies in a plate plane and said riser lies
in a riser plane, the riser plane being perpendicular to
the plate plane,
wherein said fertilizer delivery assembly has a first rigid
tube with a first rigid tube first end and a first rigid tube
second end, said first rigid tube second end being
perpendicular to said first rigid tube first end, said
fertilizer delivery assembly further has a second rigid
tube with a second rigid tube first end and a second
rigid tube second end, said second rigid tube second
end being perpendicular to said second rigid tube first
end, and said fertilizer delivery assembly further has a
first flexible tube depending down adjacent said plate
first side at said plate rear from said first rigid tube, and
a second flexible tube depending down adjacent said
second plate side at said plate rear from said second
rigid tube, and
wherein the first rigid tube and the second rigid tube are
connected to said plate top and wherein the first rigid
tube first end and the second rigid tube first end are
parallel to said plate plane.

* * * * *